June 4, 1963  M. I. JAFFE  3,092,581
FILTER ELEMENT
Filed April 11, 1960

INVENTOR.
Myron J. Jaffe
BY
Ezekiel Wolf, Wolf + Greenfield
ATTORNEYS

United States Patent Office 3,092,581
Patented June 4, 1963

3,092,581
FILTER ELEMENT
Myron I. Jaffe, Waban, Mass.
(% Gibbs Ltd., 3390 Washington St., Boston 30, Mass.)
Filed Apr. 11, 1960, Ser. No. 21,247
8 Claims. (Cl. 210—510)

The present invention relates to a filter and more particularly to a filter design for use in connection with gases or liquids.

It is an object of the present invention to provide a filter designed to withstand high differential pressures when used for filtering gases or liquids. It is also an object of the present invention to provide a filter construction utilizing a combination of porous metal filter material and wire mesh filter material arranged to prevent inadvertent migration of particles of the porous material into a filtering system as well as into other portions of a filter element.

In addition, the present invention provides a means for effecting a uniform flow of gas or liquid through the entire filter element and through a plurality of different filtering mediums.

In a preferred embodiment of the invention a substantially cylindrical metal core is formed with a passage extending through one end which is adapted to be secured to a filter assembly. The core is provided with a plurality of holes extending radially from the passage to a spiral groove formed longitudinally on the surface of the core. A wire mesh cloth is wrapped about this groove and is secured in position by a retaining wire. A porous metal casing is sintered or molded about the wire mesh cloth and forms the outer portions of the filter element.

These and other objects of the present invention will be more clearly understood when considered in conjunction with the accompanying drawings, in which.

Figure 1:
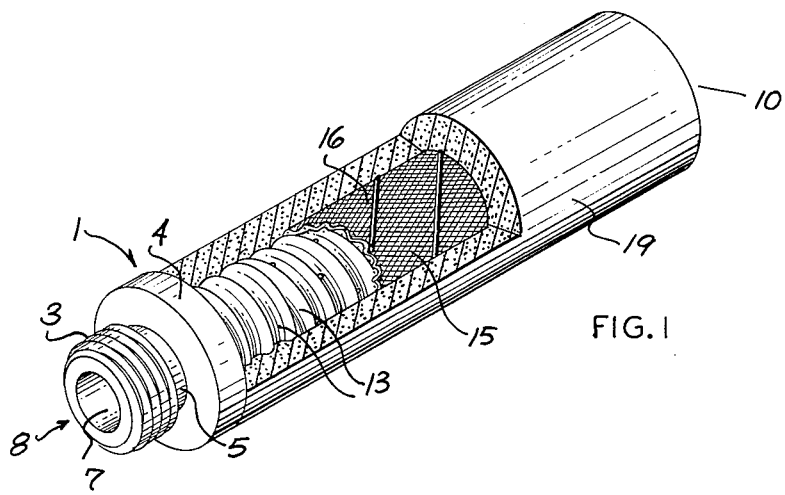
FIG. 1 is a cut-away perspective view of a preferred embodiment of the invention.

The embodiment illustrated is designed to be threaded to an aperture of a filter body. Such filter body may be of any desired size or shape and may be useful or intended for a wide variety of purposes.

The core 1 has a generally cylindrical body 2. A male threaded section 3 is formed at one end 8 with an outwardly flared flange 4 interposed between and integral with the section 3 and body 2. An annular relief section 5 is interposed between the male threaded section 3 and the flange 4 for the purpose of seating an O ring if desired. Integral with the other end 10 is a hexagonal protrusion 6. This protrusion is useful for engaging the filter with a wrench for tightening or loosening the filter. A passage 7 extends longitudinally and axially through the core 1 from the one end 8 at which the threaded section 3 is formed to a point 9 short of the other end 10. A plurality of annular grooves 11 and 12 are formed at opposite ends of the cylindrical body 2. Intermediate these grooves 11 and 12 there is a spiral groove 13 extending substantially the length of the body 2. A plurality of radially arranged holes 14 extend outwardly from the passage 7 through the cylindrical body 2. Wrapped about the spiral groove 13 is a fine mesh wire cloth 15 which is preferably formed of a metal such as copper. This wire cloth extends substantially the length of the cylindrical body terminating just short of the end annular grooves 11 and 12. The wire cloth 15 is wrapped about the cylindrical body 2 several times. This wire cloth 15 is secured over the spiral groove 13 by a retaining wire 16. The wire 16 is wound in a spiral direction opposite to that of the groove 13 to prevent the wire from lodging in the groove 13 and thereby restrict the flow of gases or fluids through the holes 14. The ends of the wire 16 are wrapped tightly about the annular grooves 11 and 12 adjacent to the spiral groove 13 with the ends of the wire 16 tied tightly in these annular grooves 11 and 12 as illustrated at 17 and 18, so as to firmly hold the wire cloth 15 in place. A porous metal casing 19 is either sintered or molded about the cylindrical body 2 from the flange 4 to the other end 10. This casing is rigidly secured on the core by interengagement with the annular grooves 11 and 12 as well as engagement with the retaining wire 16.

The mesh size of the wire cloth 15 should be smaller than the particle size of the material which comprises the metal casing 19 so that particles from the casing 19 will not pass through the wire cloth and holes 14 into the filter system. The wire 16 should be tied in such a manner at its ends as to prevent any leakage or passage of material or particles of the porous metal casing between the ends of the wire cloth and the core 1. The holes 14 should be so selected as to minimize the weakening of the core 1.

It is preferable that all material used in this construction have a copper base so that the porous metal casing 19 when molded or sintered on to the core 1 will fuse itself into engagement with the core 1 as well as the retaining wire 16, and wire cloth 15.

Figure 2:
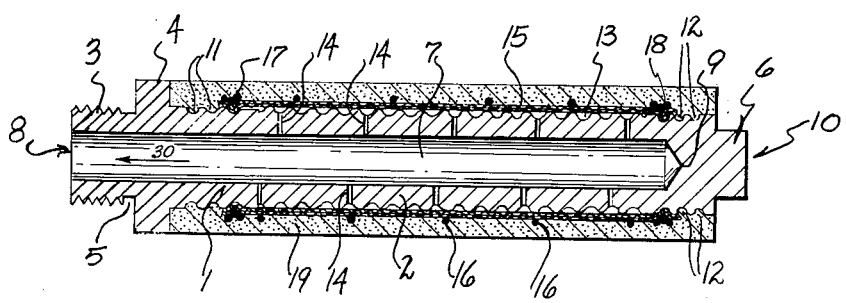
FIG. 2 is a longitudinal cross section of the embodiment illustrated in FIG. 1, and, FIG. 3 is a fragmentary perspective detail of the end of the preferred embodiment showing the right end as viewed in FIG. 2.
Figure 3:
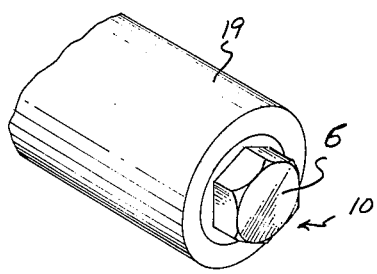

In the operation of this device a fluid, gas or liquid passes first through the porous metal casing 19 thence through the wire mesh 15, the holes 14 and then into the passage 7. The fluid flow direction is shown by arrow 30 in FIG. 2. It has been found that this particular construction will withstand a six thousand pounds per square inch differential under static conditions with no ill effect.

The utilization of the spiral groove 13 substantially aids in providing a free flow interconnected flow system for the gas or liquid. Various material may be used to form the filter construction. These include ordinary or stainless steel or various combinations. However, it is preferable that materials which normally bond together during a sintering operation be utilized in order to obtain a more satisfactory integral unit.

What is claimed is:

1. A filter construction comprising an elongated core having a passage extending from one end to a point short of the other end, said core having a spiral groove formed on the outer surface thereof intermediate said ends with a plurality of holes extending through said core from said passage to a radial innermost portion of said groove, a wire mesh cloth wrapped about and contracting ridges formed by said groove and covering in spaced relation said holes, a retaining wire wrapped about said cloth and securing it over said core, and a central portion of a porous sintered metal casing covering said grooves and wire cloth and contiguous with said wire cloth.

2. A filter construction as set forth in claim 1 wherein said retaining wire is wrapped in spiral opposition to said groove.

3. A filter construction as set forth in claim 1 wherein a plurality of annular grooves are formed at each end of said spiral groove in said core, and said retaining wire is anchored at its ends in said annular grooves.

4. A filter construction as set forth in claim 1 wherein a plurality of annular grooves are formed at each end of said spiral groove in said core, with said wire cloth extending at least over one of said annular grooves at each end, and said retaining wire is wrapped in spiral opposition to said spiral groove and is anchored at its ends in said annular grooves.

5. A filter as set forth in claim 4 wherein said casing is interengaged at its ends with said annular grooves.

6. A filter construction as set forth in claim 1 wherein said core is formed with an outwardly flared flange adjacent said one end, with means at said one end for engaging said core.

7. A filter construction as set forth in claim 4 wherein said core is formed with an outwardly flared flange adjacent said one end and with said porous metal casing extending from said flange to said other end, said casing engaging said annular grooves.

8. A filter construction as set forth in claim 1 wherein said one end is formed with means for support of said construction including a male threaded section.

References Cited in the file of this patent

UNITED STATES PATENTS

| | | |
|---|---|---|
| 2,575,995 | Briggs | Nov. 20, 1951 |
| 2,739,916 | Parker | Mar. 27, 1956 |
| 2,877,903 | Veres | Mar. 17, 1959 |
| 2,887,230 | Sicard | May 19, 1959 |

FOREIGN PATENTS

| | | |
|---|---|---|
| 724,453 | Great Britain | Feb. 23, 1955 |